(12) United States Patent
Igawa

(10) Patent No.: US 11,933,422 B2
(45) Date of Patent: Mar. 19, 2024

(54) STEAM CONTROL VALVE

(71) Applicant: MITSUBISHI HEAVY INDUSTRIES, LTD., Tokyo (JP)

(72) Inventor: Hiroshi Igawa, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/886,300

(22) Filed: Aug. 11, 2022

(65) Prior Publication Data

US 2023/0050574 A1 Feb. 16, 2023

(30) Foreign Application Priority Data

Aug. 16, 2021 (JP) ................. 2021-132406

(51) Int. Cl.
*F16K 31/52* (2006.01)
*F16K 11/04* (2006.01)

(52) U.S. Cl.
CPC .................... *F16K 31/52* (2013.01)

(58) Field of Classification Search
CPC .... F16K 31/52; F16K 11/04; F16K 2200/203; F17C 19/10; F17C 29/02
USPC ....................................... 251/279
See application file for complete search history.

(56) References Cited

U.S. PATENT DOCUMENTS

| | | | |
|---|---|---|---|
| 3,892,382 A | 7/1975 | Dresner | |
| 4,456,032 A | 6/1984 | Straslicka | |
| 5,333,989 A | 8/1994 | Missana et al. | |
| 5,354,234 A * | 10/1994 | Arold | F16C 7/04 251/228 |
| 6,425,645 B1 * | 7/2002 | Tsurutani | F16C 19/10 384/615 |
| 2016/0069460 A1 * | 3/2016 | Saldivar | F16K 27/067 251/279 |

FOREIGN PATENT DOCUMENTS

| | | |
|---|---|---|
| JP | S50-37027 A | 4/1975 |
| JP | S50-85827 U | 7/1975 |
| JP | S59-4581 B2 | 1/1984 |
| JP | S59-9041 Y2 | 3/1984 |
| JP | 2012-21568 A | 2/2012 |
| JP | 2016-160973 A | 9/2016 |

OTHER PUBLICATIONS

Office Action dated Jun. 20, 2023, issued in counterpart JP Application No. 2021-132406, with English trasnlation. (6 pages).

* cited by examiner

*Primary Examiner* — Paul J Gray
(74) *Attorney, Agent, or Firm* — WHDA, LLP

(57) ABSTRACT

A steam control valve including a valve seat, a valve disc that is abuttable on the valve seat, a valve lifting rod that is linked to the valve disc and extends in a vertical direction, a bushing that supports the valve lifting rod slidably, a lever linked to an upper end of the valve lifting rod, and an actuator that causes the lever to pivot, in which a box section having a downward-facing opening is provided on one end side of the lever, and the box section of the lever loosely fits an overhang section on a side of the valve lifting rod.

5 Claims, 6 Drawing Sheets

STEAM CONTROL VALVE

BACKGROUND OF THE INVENTION

1. Field of the Invention

The present invention relates to a steam control valve.

2. Description of the Related Art

Steam turbines include a steam control valve for adjusting the supply flow rate of steam, according to loads. A steam control valve according to JP-2016-160973-A includes: a plurality of valve seats that are formed inside a casing; a plurality of valve discs that are respectively abuttable on the plurality of valve seats; a pair of valve lifting rods that are linked to the plurality of valve discs, extend in a vertical direction, and penetrate the casing; a pair of cylindrical bushings that are provided to the casing, and respectively support the pair of valve lifting rods slidably; a pair of levers that are respectively linked to the upper ends of the pair of valve lifting rods; and an actuator (specifically, a hydraulic cylinder or a servomotor) that causes the pair of levers to pivot.

The upper end of one valve lifting rod among the pair of valve lifting rods is coupled to one end of one lever among the pair of levers by a pin. The upper end of the other valve lifting rod is coupled to one end of the other lever by a pin. The actuator is linked to the other end of the one lever and the other end of the other lever, and causes the levers to pivot upward or downward. This causes to move the plurality of valve discs upward or downward via the pair of valve lifting rods and the like. Thereby, the degrees of opening of the plurality of valve seats are adjusted, and the supply flow rate of steam is adjusted.

PRIOR ART DOCUMENT

Patent Document

Patent Document 1: JP-2016-160973-A

Meanwhile, due to thermal expansion of the casing of a steam control valve caused by steam, the positions of bushings change slightly. According to the conventional technology mentioned above, the degree of freedom of the arrangement of the valve lifting rods is low because the valve lifting rods and the levers are coupled by pins. Accordingly, there is a possibility that the valve lifting rods become eccentric or oblique to the bushings, and wear of the valve lifting rods is facilitated.

SUMMARY OF THE INVENTION

An object of the present invention is to provide a steam control valve that can enhance the degree of freedom of the arrangement of valve lifting rod, and reduce wear of the valve lifting rod.

In order to achieve the object described above, according to the present invention, a steam control valve includes: a valve seat; a valve disc that is abuttable on the valve seat; a valve lifting rod that is linked to the valve disc, and extends in a vertical direction; a bushing that supports the valve lifting rod slidably; a lever linked to an upper end of the valve lifting rod; and an actuator that causes the lever to pivot, in which a box section having a downward-facing opening is provided on one end side of the lever, and the box section of the lever loosely fits an overhang section on a side of the valve lifting rod.

According to the present invention, it is possible to enhance the degree of freedom of the arrangement of valve lifting rod, and reduce wear of the valve lifting rod.

DESCRIPTION OF THE PREFERRED EMBODIMENTS

A first embodiment of the present invention is explained with reference to the figures.

Figure 1:
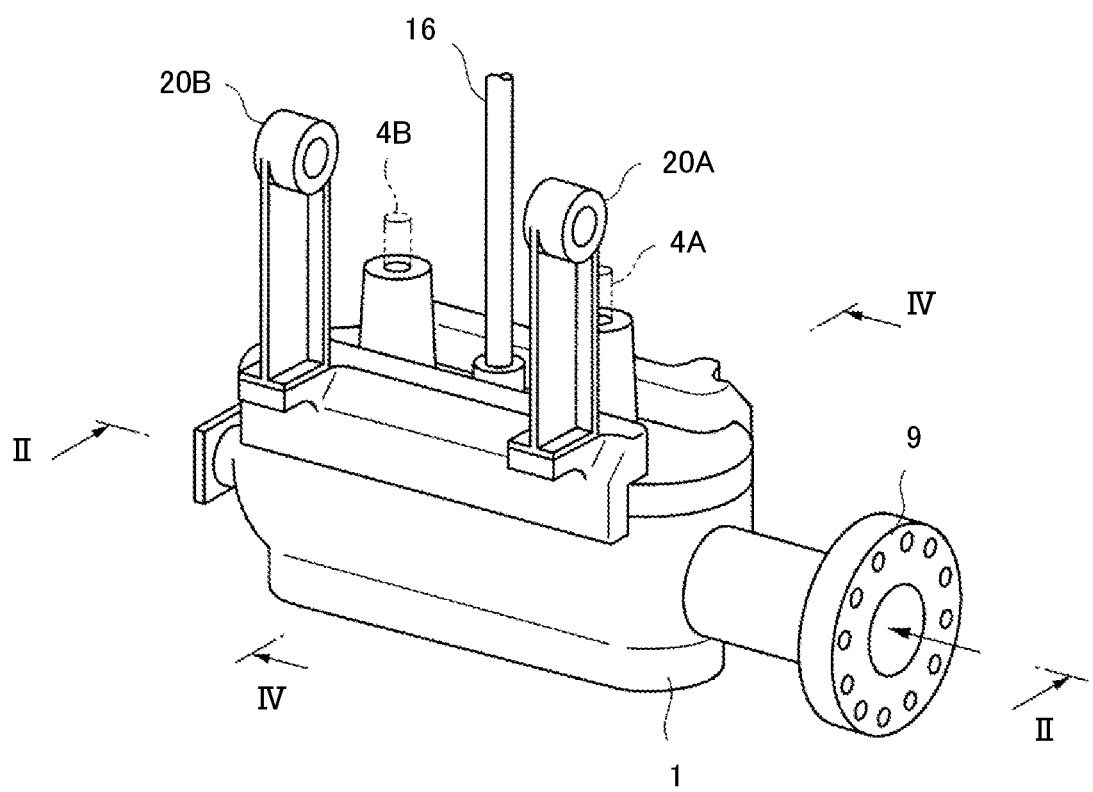
FIG. 1 is a perspective view depicting the structure of a steam control valve in a first embodiment of the present invention.
Figure 2:
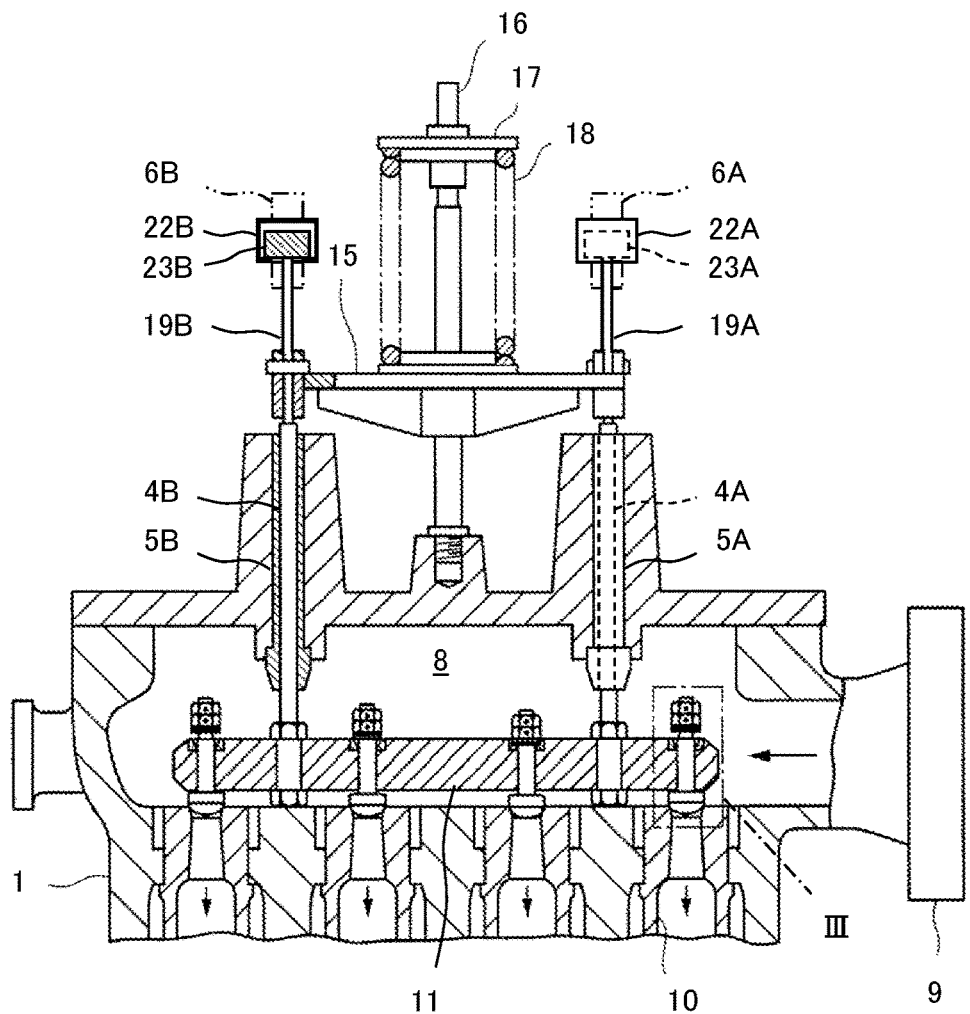
FIG. 2 is a cross-sectional view taken along a cross-section II-II in FIG. 1.
Figure 3:
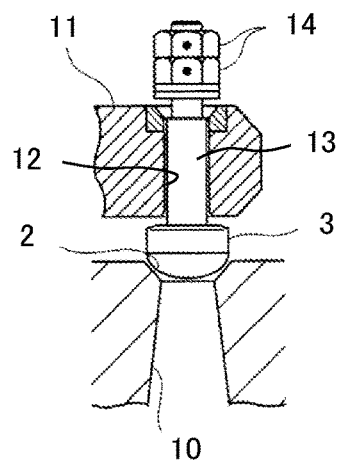
FIG. 3 is a partial enlarged cross-sectional view taken at a portion III in FIG. 2.
Figure 4:
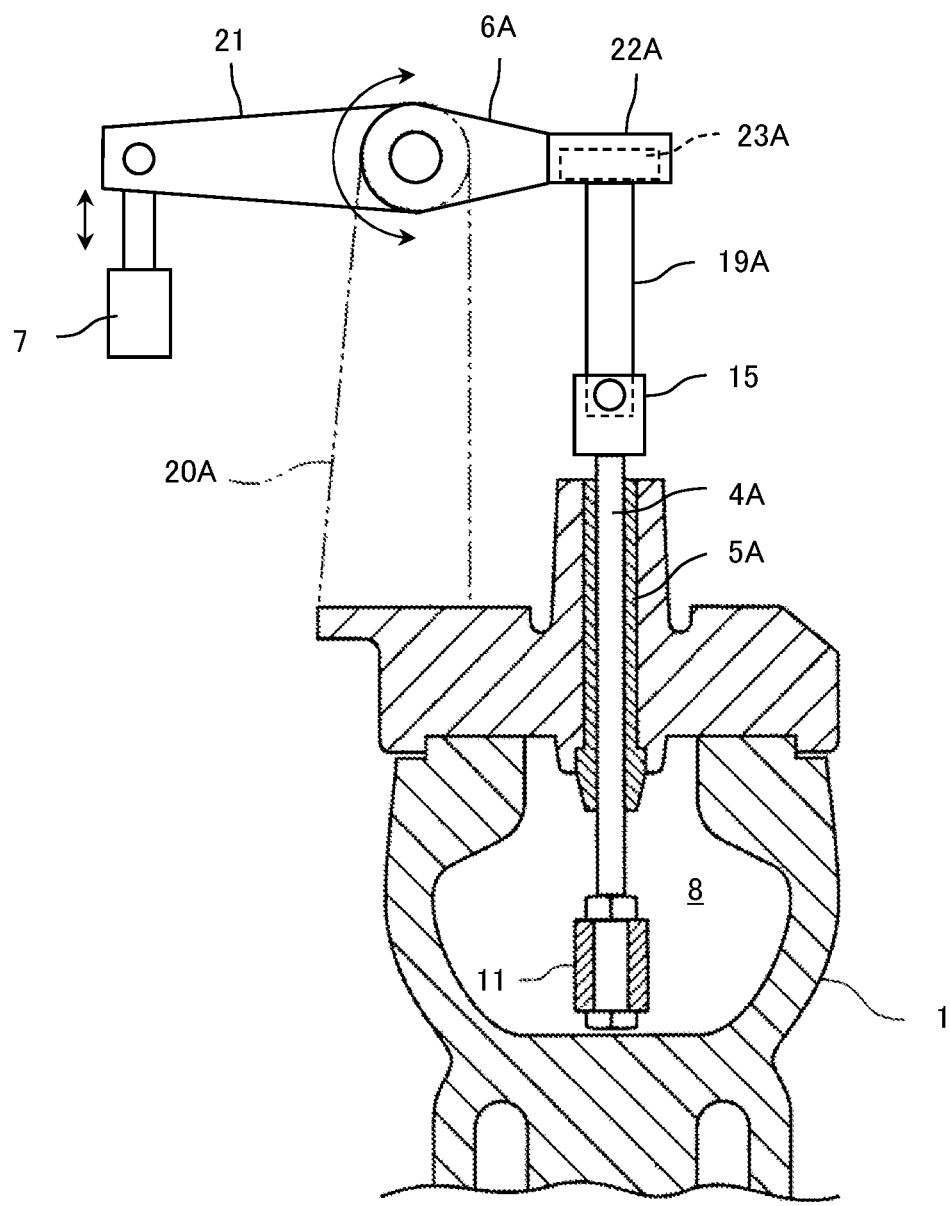
FIG. 4 is a cross-sectional view taken along a cross-section IV-IV in FIG. 1.
Figure 5:
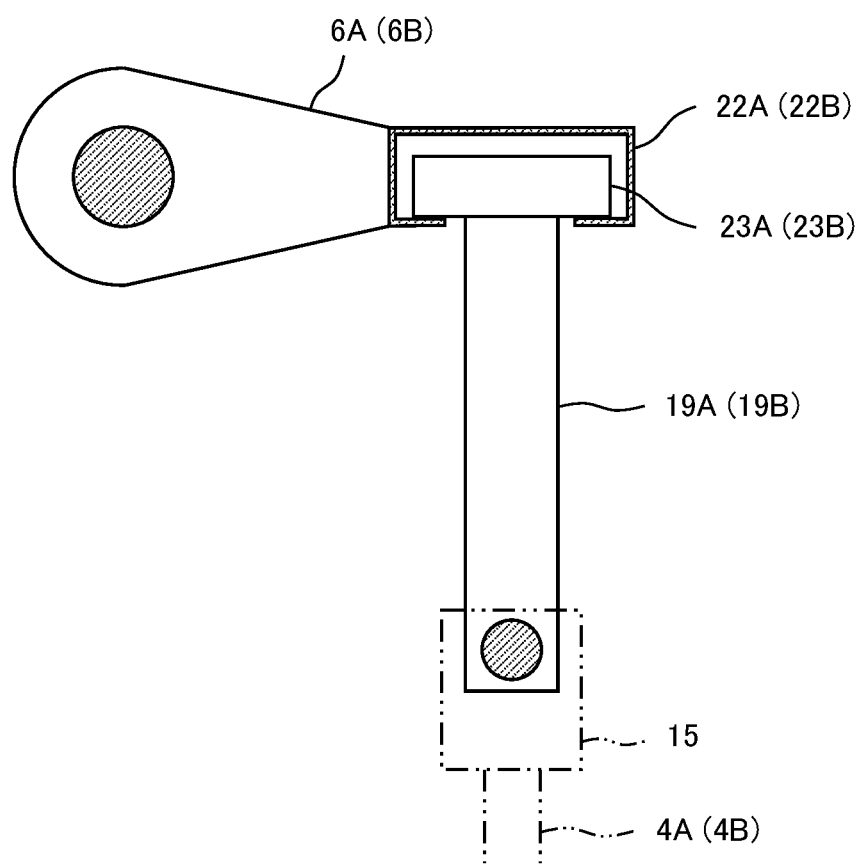
FIG. 5 is a cross-sectional view depicting a structure for coupling a connecting member to a lever in the first embodiment of the present invention.

FIG. 1 is a perspective view depicting the structure of a steam control valve in the present embodiment, and some sections thereof are omitted in the figure for convenience purposes. FIG. 2 is a cross-sectional view taken along a cross-section II-II in FIG. 1, and FIG. 3 is a partial enlarged cross-sectional view taken at a portion III in FIG. 2. FIG. 4 is a cross-sectional view taken along a cross-section IV-IV in FIG. 1. FIG. 5 is a cross-sectional view depicting a structure for coupling a connecting member to a lever in the present embodiment.

The steam control valve according to the present embodiment includes: a plurality of valve seats 2 (four valve seats 2 in the present embodiment) that are formed inside a casing 1; a plurality of valve discs 3 (four valve discs 3 in the present embodiment) each of which is abuttable on a corresponding one of the plurality of valve seats 2; a pair of valve lifting rods 4A and 4B that are linked to the plurality of valve discs 3, extend in a vertical direction, and penetrate the casing 1; a pair of cylindrical bushings 5A and 5B that are provided to the casing 1, and respectively support the pair of valve lifting rods 4A and 4B slidably; a pair of levers 6A and 6B that are respectively linked to the upper ends of the pair of valve lifting rods 4A and 4B; and an actuator 7 (specifically, a hydraulic cylinder or a servomotor) that causes the pair of levers 6A and 6B to pivot.

A steam chest (valve chest) 8 is formed inside the casing 1, and a steam inlet port 9 is formed at a side section of the casing 1 and communicates with the steam chest 8. Thereby, high-temperature and high-pressure steam can be introduced into the steam chest 8 via the steam inlet port 9. A plurality of steam supply ports 10 are formed at a bottom section of the casing 1, and communicate with the steam chest 8. Each of the plurality of valve seats 2 is formed at an opening edge section of a corresponding one of the plurality of steam supply ports 10. The plurality of valve discs 3, which make the degrees of opening of the plurality of valve seats 2 variable, make it possible to adjust the supply rate of steam supplied from the steam chest 8 to a casing (not depicted) of the steam turbine.

A valve lifting plate 11 is arranged in the steam chest 8 of the casing 1. A plurality of through-holes 12 are formed through the valve lifting plate 11, and each of a plurality of valve rods 13 is inserted to a corresponding one of the plurality of through-holes 12. A valve disc 3 is provided on the bottom side of each valve rod 13, and double nuts 14 are screwed onto a screw section on the top side of each valve rod 13. By adjusting the position of the double nuts 14 relative to each valve rod 13, it is made possible to adjust the lower limit position of descending motion of each valve disc 3 relative to the valve lifting plate 11, and adjust opening and closing timings of each valve seat 2. By making opening and closing timings of the plurality of valve seats 2 different, it is made possible to vary the degree of opening of the plurality of valve seats 2 stepwise as a whole.

The lower ends of the valve lifting rods 4A and 4B are coupled to the valve lifting plate 11. The upper ends of the valve lifting rods 4A and 4B are coupled to each other via a coupling member 15. Specifically, male screw sections at the upper ends of the valve lifting rods 4A and 4B are screwed into female screw sections at both ends of the coupling member 15.

A guide rod 16 is arranged upright on the top side of the casing 1, and is inserted into a through-hole at the middle of the coupling member 15. A spring retaining member 17 is provided at the upper end of the guide rod 16, and a spring 18 is provided between the spring retaining member 17 and the coupling member 15. The spring 18 can urge the plurality of valve discs 3 downward via the coupling member 15, the valve lifting rods 4A and 4B, and the valve lifting plate 11.

The upper end of the valve lifting rod 4A is coupled to the lower end of a connecting member 19A via the coupling member 15, and the upper end of the valve lifting rod 4B is coupled with the lower end of a connecting member 19B via the coupling member 15. Specifically, the lower end of the connecting member 19A and the coupling member 15 are coupled to each other by a pin, and the lower end of the connecting member 19B and the coupling member 15 are coupled to each other by a pin.

One end of the lever 6A is coupled to the upper end of the connecting member 19A, and one end of the lever 6B is coupled to the upper end of the connecting member 19B. The other ends of the levers 6A and 6B are supported by brackets 20A and 20B, respectively, of the casing 1 rotatably. In addition, the other ends of the levers 6A and 6B are linked to the actuator 7 via link members 21. When the actuator 7 causes the levers 6A and 6B to pivot upward or downward, the plurality of valve discs 3 move upward or downward via the connecting members 19A and 19B, the coupling member 15, the valve lifting rods 4A and 4B, and the valve lifting plate 11. Thereby, the degrees of opening of the plurality of valve seats 2 can vary.

A significant feature of the present embodiment is that a rectangular-parallelepiped box section 22A having a downward-facing opening is provided on one end side of the lever 6A, a rectangular-parallelepiped overhang section 23A is provided on the upper end side of the connecting member 19A, and the box section 22A of the lever 6A loosely fits the overhang section 23A of the connecting member 19A. In other words, the connecting member 19A and the like are hung from the box section 22A of the lever 6A. The overall size of the internal space of the box section 22A of the lever 6A (i.e. the size of the internal space in a vertical direction and a horizontal direction) is larger than the overhang section 23A of the connecting member 19A by an amount corresponding to a predetermined value (e.g. approximately several millimeters) taking into consideration positional shifts of the bushing 5A due to thermal expansion of the casing 1. In addition, the opening of the box section 22A of the lever 6A is larger than the cross-section of the body of the connecting member 19A by an amount corresponding to the predetermined value mentioned before, and additionally, is smaller than the cross-section of the overhang section 23A of the connecting member 19A by an amount corresponding to the predetermined value mentioned before. Note that, in the present embodiment, the inner surface of the box section 22A of the lever 6A supports the overhang section 23A of the connecting member 19A movably.

Similarly, a rectangular-parallelepiped box section 22B having a downward-facing opening is provided on one end side of the lever 6B, a rectangular-parallelepiped overhang section 23B is provided on the upper end side of the connecting member 19B, and the box section 22B of the lever 6B loosely fits the overhang section 23B of the connecting member 19B. In other words, the connecting member 19B and the like are hung from the box section 22B of the lever 6B. The overall size of the internal space of the box section 22B of the lever 6B (i.e. the size of the internal space in a vertical direction and a horizontal direction) is larger than the overhang section 23B of the connecting member 19B by an amount corresponding to a predetermined value (e.g. approximately several millimeters) taking into consideration positional shifts of the bushing 5B due to thermal expansion of the casing 1. In addition, the opening of the box section 22B of the lever 6B is larger than the cross-section of the body of the connecting member 19B by an amount corresponding to the predetermined value mentioned before, and additionally, is smaller than the cross-section of the overhang section 23B of the connecting member 19B by an amount corresponding to the predetermined value mentioned before. Note that, in the present embodiment, the inner surface of the box section 22B of the lever 6B supports the overhang section 23B of the connecting member 19B movably.

In the thus-configured present embodiment, the degree of freedom of the arrangement of the valve lifting rods 4A and 4B can be enhanced as compared to a case where one end of the lever 6A and the upper end of the connecting member 19A are coupled to each other by a pin, and additionally, one end of the lever 6B and the upper end of the connecting member 19B are coupled to each other by a pin. Thereby, even if the positions of the bushings 5A and 5B change slightly due to thermal expansion of the casing 1, the positions of the valve lifting rods 4A and 4B can be followed. Accordingly, it is possible to prevent the valve lifting rods 4A and 4B from being eccentric or oblique to the bushings 5A and 5B, and reduce wear of the valve lifting rods 4A and 4B.

A second embodiment of the present invention is explained. Note that portions in the present embodiment that are equivalent to their counterparts in the first embodiment are given identical reference characters, and explanations thereof are omitted as appropriate.

Figure 6:
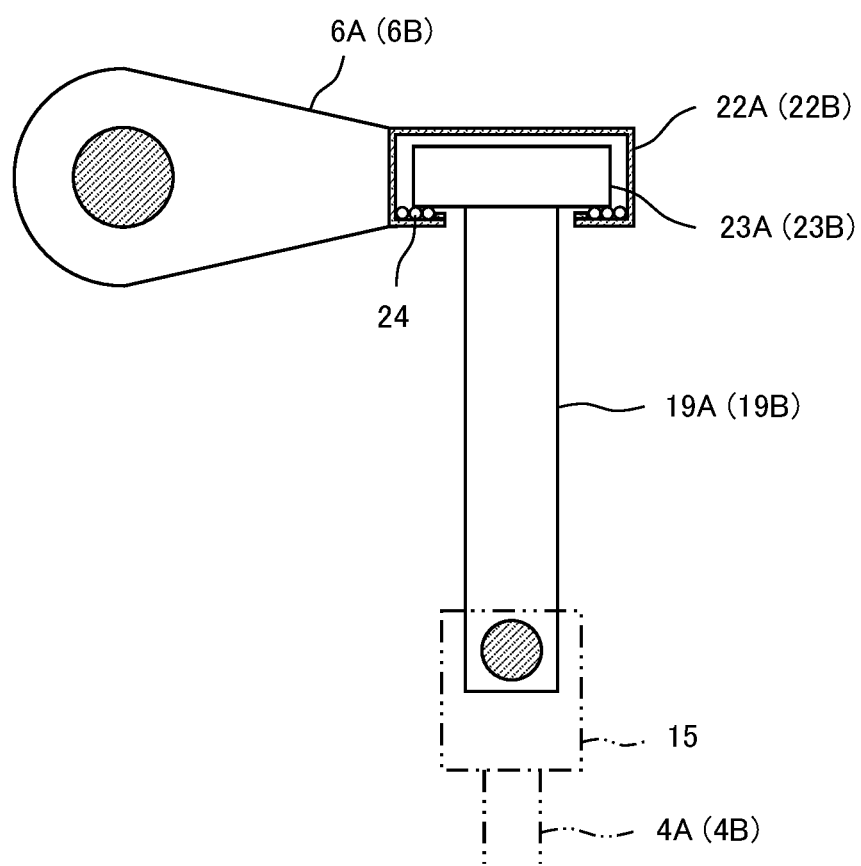
FIG. 6 is a cross-sectional view depicting a structure for coupling a connecting member to a lever in a second embodiment of the present invention.

FIG. 6 is a cross-sectional view depicting a structure for coupling a connecting member to a lever in the present embodiment.

The steam control valve according to the present embodiment includes a plurality of steel balls 24 that are housed in the box section 22A of the lever 6A and support the overhang section 23A of the connecting member 19A movably, and a plurality of steel balls 24 that are housed in the box section 22B of the lever 6B and support the overhang section 23B of the connecting member 19B movably.

In the thus-configured present embodiment also, similarly to the first embodiment, it is possible to enhance the degree of freedom of the arrangement of the valve lifting rods 4A and 4B, and reduce wear of the valve lifting rods 4A and 4B. In addition, in the present embodiment, due to the plurality of steel balls 24, it is possible to reduce frictional forces generated between the box sections of the levers and the overhang sections of the connecting members.

A third embodiment of the present invention is explained. Note that portions in the present embodiment that are equivalent to their counterparts in the first embodiment are given identical reference characters, and explanations thereof are omitted as appropriate.

Figure 7:
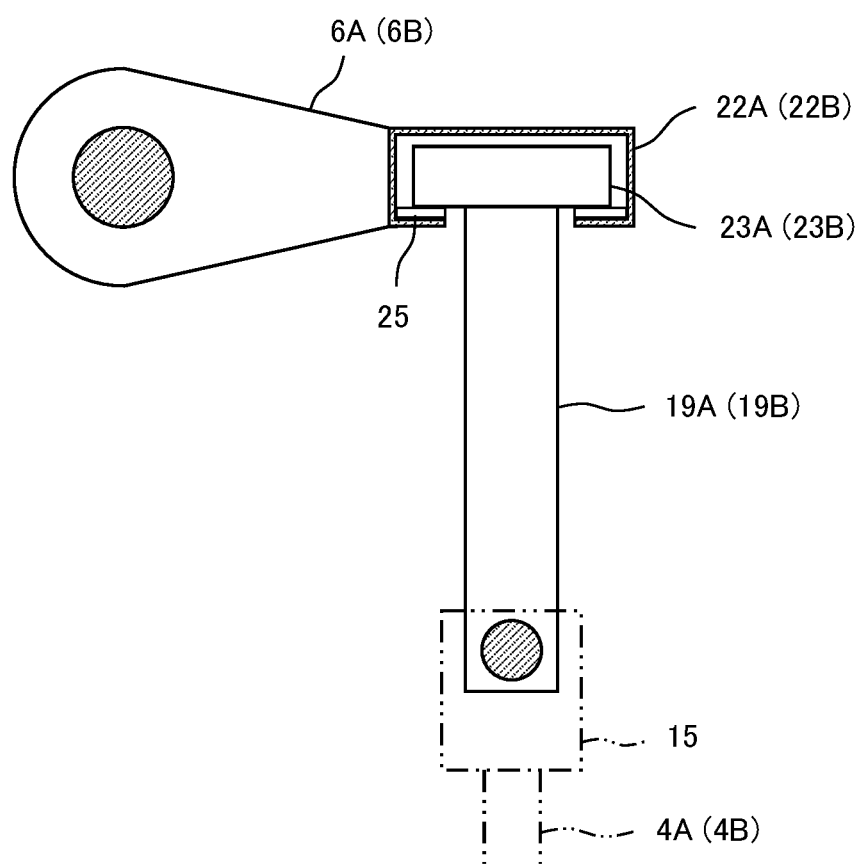
FIG. 7 is a cross-sectional view depicting a structure for coupling a connecting member to a lever in a third embodiment of the present invention.

FIG. 7 is a cross-sectional view depicting a structure for coupling a connecting member to a lever in the present embodiment.

The steam control valve according to the present embodiment includes a sliding plate 25 that is housed in the box section 22A of the lever 6A and supports the overhang section 23A of the connecting member 19A movably, and a sliding plate 25 that is housed in the box section 22B of the lever 6B and supports the overhang section 23B of the connecting member 19B movably. The sliding plates 25 are formed such that the friction coefficient thereof becomes lower than the friction coefficients of the box sections 22A and 22B of the levers by using a preferable material therefor or subjecting them to a preferable surface treatment.

In the thus-configured present embodiment also, similarly to the first embodiment, it is possible to enhance the degree of freedom of the arrangement of the valve lifting rods 4A and 4B, and reduce wear of the valve lifting rods 4A and 4B. In addition, in the present embodiment, due to the sliding plates 25, it is possible to reduce frictional forces generated between the box sections of the levers and the overhang sections of the connecting members.

Note that whereas the box sections 22A and 22B of the levers, and the overhang sections 23A and 23B of the connecting members are formed into rectangular-parallelepiped shapes in example cases explained in the first to third embodiments, these are not the sole examples, and they may be formed into cubic shapes or spherical shapes, for example.

In addition, whereas the coupling member 15 and the connecting member 19A are interposed between the valve lifting rod 4A and the lever 6A, the coupling member 15 and the connecting member 19B are interposed between the valve lifting rod 4B and the lever 6B, and the overhang sections 23A and 23B are provided to the connecting members 19A and 19B in example cases explained in the first to third embodiments, these are not the sole examples. That is, for example, the coupling member and the connecting members may not be interposed between the valve lifting rods and the levers, and the overhang sections may be provided to the valve lifting rods.

DESCRIPTION OF REFERENCE CHARACTERS

2: Valve seat
3: Valve disc
4A, 4B: Valve lifting rod
5A, 5B: Bushing
6A, 6B: Lever
7: Actuator
19A, 19B: Connecting member
22A, 22B: Box section
23A, 23B: Overhang section
24: Steel ball
25: Sliding plate

What is claimed is:

1. A steam control valve comprising:
   a casing;
   a valve seat that is formed inside the casing;
   a valve disc that is abuttable on the valve seat;
   a valve lifting rod that is linked to the valve disc, extends in a vertical direction, and penetrates the casing;
   a bushing that is provided to the casing and supports the valve lifting rod slidably;
   a lever linked to an upper end of the valve lifting rod; and
   an actuator that causes the lever to pivot, wherein
   a box section having a downward-facing opening is provided on one end side of the lever,
   the box section of the lever loosely fits an overhang section on a side of the valve lifting rod, and
   an internal space of the box section of the lever is larger than the overhang section in a vertical direction and a horizontal direction by an amount corresponding to a predetermined value taking into consideration positional shifts of the bushing due to thermal expansion of the casing such that the internal space of the box section allows the overhang section to move with respect to the box section in the vertical direction, in the horizontal direction and in a direction other than the vertical direction and the horizontal direction.

2. The steam control valve according to claim 1, wherein
   the lever is linked to an upper end of the valve lifting rod via a connecting member,
   the overhang section is provided to the connecting member, and
   the opening of the box section of the lever is larger than the cross-section of a body of the connecting member by an amount corresponding to the predetermined value, and is smaller than the cross-section of the overhang section of the connecting member by an amount corresponding to the predetermined value.

3. The steam control valve according to claim 1, including a plurality of steel balls that are housed in the box section of the lever and support the overhang section movably.

4. The steam control valve according to claim 1, including a sliding plate that is housed in the box section of the lever and supports the overhang section movably.

5. The steam control valve according to claim 1, wherein the internal space of the box section allows the overhang section to move freely with respect to the box section in the vertical direction, in the horizontal direction and in a direction other than the vertical direction and the horizontal direction.

* * * * *